United States Patent [19]

DeMasi

[11] 4,102,026
[45] Jul. 25, 1978

[54] STRIPPER BAR FOR ROLLING PIN

[76] Inventor: Ralph G. DeMasi, 208 Hilldale Ave., Syracuse, N.Y. 13206

[21] Appl. No.: 786,482

[22] Filed: Apr. 8, 1977

[51] Int. Cl.² .............................................. B05C 1/08
[52] U.S. Cl. ................................................. 29/110.5
[58] Field of Search ............... 29/110.5; 425/327, 353, 425/373

[56] References Cited

U.S. PATENT DOCUMENTS

| | | | |
|---|---|---|---|
| 2,629,345 | 2/1953 | Check | 29/110.5 |
| 2,652,009 | 9/1953 | Mees | 29/110.5 |
| 2,725,830 | 12/1955 | Shebesta | 29/110.5 |

Primary Examiner—Alfred R. Guest
Attorney, Agent, or Firm—Clarence A. O'Brien; Harvey B. Jacobson

[57] ABSTRACT

The invention provides a mechanism attachable to a rolling pin such as is used by bakers in the working of dough, the present mechanism having an edge member closely adjacent the cylindrical working surface of the rolling pin and extending longitudinally along the length of said pin. The edge member of the present mechanism acts to strip dough from the rolling pin during rolling of the dough.

11 Claims, 4 Drawing Figures

STRIPPER BAR FOR ROLLING PIN

BACKGROUND AND SUMMARY OF THE INVENTION

The present invention relates generally to improvements in kitchen utensils, more particularly to an improved rolling pin such as is used in households and bakeries for rolling out dough or for similar operations associated with baking or in the processing of a material having a consistency of a similar nature. Rolling pins, though commonly used for centuries, have been improved within the last century as exemplified by the teaching of the following U.S. Pat. Nos. :

777,349 — Mitchell: Dec. 13,1904
855,042 — Cattlin: May 28, 1907
2,652,009 — Mees: Sept. 15, 1953
2,725,830 — Shebesta: Dec. 6, 1955

The patent to Cattlin discloses a rolling pin having a flour hopper mounted thereon with vertically sliding plates which have a lower edge positioned adjacent the peripheral cylindrical surface of the pin. The plates of Cattlin do not function, however, to remove adhering dough from the rolling pin. Mitchell discloses a dough-forming machine in which a scraper or blade removes dough from the rolls of the machine. Mees and Shebesta disclose handle attachments for rolling pins. The prior art does not disclose an attachment for a conventional rolling pin which can be removably attached to the handles of the rolling pin and having an edge member extending longitudinally of the working surface of the pin and closely spaced therefrom to strip dough from the pin on working of a mass of dough.

The present invention provides an essentially unitary dough stripping attachment for a conventional rolling pin, the attachment having flexible end members formed with semi-cylindrical sleeve members which snap onto the handle members of the rolling pin. A major body portion of the present attachment located between the flexible end members is of a length which is slightly greater than the longitudinal length of the cylindrical working portion of the rolling pin to allow the rolling pin to rotate while the present dough stripping attachment is held essentially stationary relative to the pin. The major body portion of the attachment has spaced stripper edges which are mutually parallel and extend longitudinally of the rolling pin, the edges each being spaced from the rolling peripheral cylindrical surface of the pin a distance sufficient to allow rotation of the pin without allowing any gross material adhering thereto to be carried along on said pin surface. Thus, the rolling pin can be rolled in either possible direction, the present attachment acting in either situation to strip dough or other adhering material from the working surface of the pin. The flexible end members which snap over the handles of the rolling pin are naturally held by a user of the pin to prevent rotation of the attachment with the rolling pin.

It is therefore an object of the invention to provide a rolling pin and an attachment therefor which comprises spaced stripping edges capable of stripping adhering material from the working surface of the pin regardless of the direction of rotation of the pin.

It is a further object of the invention to provide a detachable dough stripping attachment for a rolling pin, which attachment has flexible end members which snap fit over the handles of a rolling pin, the attachment being prevented from rotation with the rolling pin by pressure exerted on the end members by a user holding the handles of the pin and working said pin in a usual manner.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
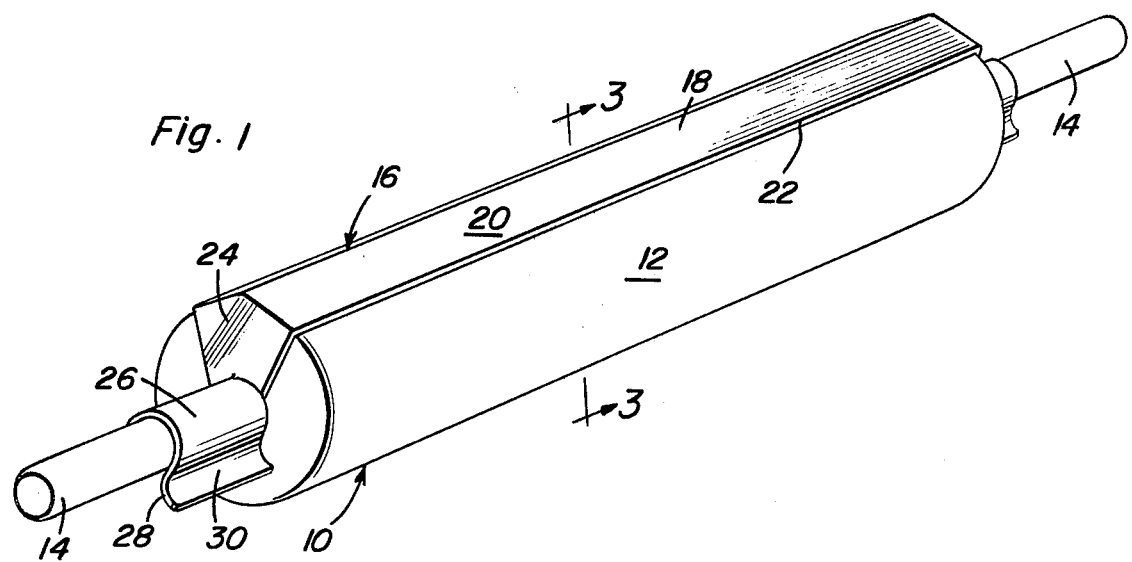
FIG. 1 is a perspective view illustrating the present dough stripping attachment assembled onto a conventional rolling pin.
Figure 2:
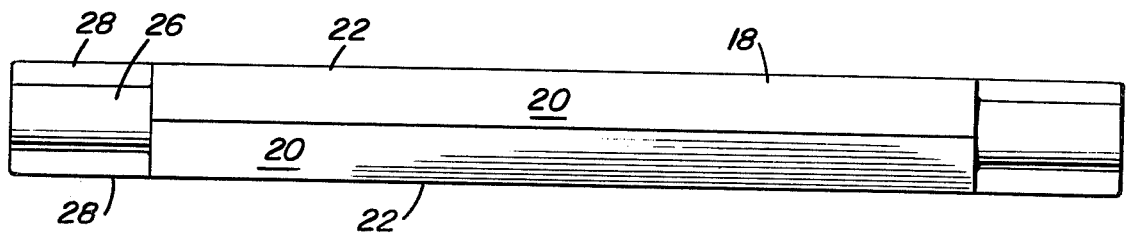
FIG. 2 is a plan view of the present dough stripping attachment.

Referring now to FIG. 1, a rolling pin is seen at 10 to comprise a cylindrical working member 12 and handle members 14, the rolling pin 10 being of conventional construction, such as wherein the member 12 is mounted on a shaft (not shown) of which the handle members 14 are the end portions thereof, the cylindrical working member 12 being rotatable on the shaft to work a mass of dough which is to be processed for baking. As can also be seen in FIG. 2, a dough stripping attachment 16 configured according to the invention is fitted onto the rolling pin 10 in a manner to be described hereinafter. The attachment 16 comprises a major body portion 18 which is bar-like in structure, the portion 18 having a length greater than the width thereof. The portion 18 could be formed as an arcuate cylindrical section or, as shown in the drawings, as intersecting rectangular plates 20. The plates 20 each have a stripping edge 22 formed along the free longitudinal edge surface thereof, the edge 22 functioning in a manner to be described hereinafter. The major body portions 18 have depending end body sections 24 which extend in a flangelike manner essentially at right angles to the portion 24. The body sections 24 have end members 26 formed thereon and spaced from the major body portion 18. The end members 26 are essentially semi-cylindrical and have arcuate flanges 28 recurring laterally from each longitudinal edge portion thereof and along the length of said edge portions to define outwardly facing recesses 30 to receive the end of the forefinger 32 and thumb 34 of a hand 36 used to manipulate pin 10. The longitudinal axes of the end members 26 are essentially parallel to the longitudinal axis of the major body portion 18 of the attachment 16.

Figure 3:
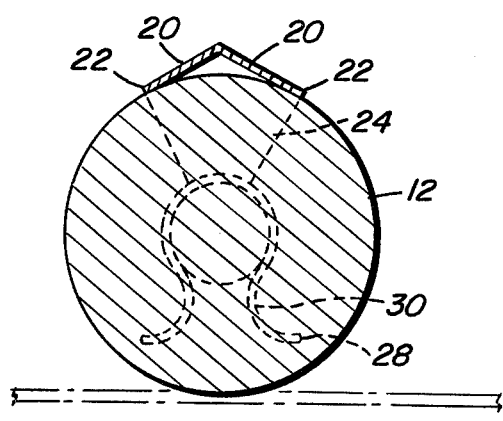
FIG. 3 is a vertical sectional view taken substantially along line 3—3 of FIG. 1.
Figure 4:
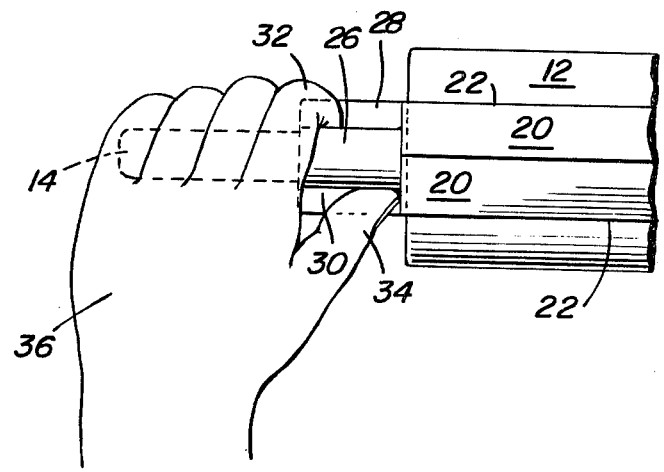
FIG. 4 is a fragmental plan view illustrating the use and operation of the invention.

As can be seen in FIGS. 1 and 3, the end members 26 of the attachment 18 snap fit over the handle members 14 of the rolling pin 10. The spacing between the flanges 28 of the end members 26 is dimensioned to allow the handle members 14 to fit therethrough on outwardly directed deformation of the flanges 28. The inner diameter of the end members 26 is dimensioned to allow the essentially cylindrical handle members 14 to be rotatable within the end members 26. Therefore, as seen in FIG. 4, a user of the rolling pin and attachment 16, on grasping of the handle members 14, naturally engages recesses 30 and applies pressure to the flanges 28 and thus prevents the attachment 18 from rotating with the rolling pin 10 when the pin is worked across a mass of dough or other material. As can be best seen in FIG. 1, the major body portion 18 of the attachment 16 is slightly longer than the working member 12 of the rolling pin 10 to allow the member 12 to roll freely of the attachment 16. As seen also in FIG. 3, the stripping edges 22 extend toward the cylindrical surface of the member 12, the edges 22 being preferably slanted toward said surface such as by "sharpening" the edges 22 therealong. The edges 22 can be spaced from the cylindrical surface of the member 12 a distance sufficient only to allow the member 12 to rotate freely. The edges 22 can actually ride on the surface of the member 12 as seen in FIG. 3.

In use, the rolling pin 10 is grasped on the handle members 14, pressure being thereby applied to the flanges 28 of the attachment 16. When the rolling pin 10 is rolled back and forth over a mass of dough to level and work the dough, the attachment 16 is prevented from rotating with said pin 10 by virtue of the pressure applied to said attachement by the user. Dough adhering to the cylindrical surface of the rolling member 12 is stripped therefrom by one of the edges 22 depending on the direction in which the pin 10 is being worked on the dough. The attachment 16 can be conveniently removed from the rolling pin 10 by snapping the end members 26 from engagement with the handle members 14, the flanges 28 being conveniently used to deform the end members 26 to allow disengagement. The rolling pin 10 and attachment 16 can thus be conveniently cleaned prior to reassembly and reuse.

The attachment 16 can be formed of a material such as metal, plastic, or other material which is susceptable to casting or forming into a unitary structure. Additionally, since the end members 26 must be flexible or resilient to allow snap fitting thereof over the handle members 14 of the rolling pin 10, a material must be chosen which, after slight deformation, can then return to its original conformation. Materials having inherent resiliency or flexibility, such as metals and most plastics in sheet form, can be used as would be known in the art given the teachings disclosed hereinabove.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus attachable to a rolling pin for stripping adhering material from the surface of a rotating cylinder member, the rolling pin having handle members extending from either end of the cylindrical member parallel to the longitudinal axis of said member, the apparatus comprising:
    a major body portion having a length greater than the length of the cylindrical member, the major body portion having a continuous outer surface and having lateral edge portions extending along each longitudinal side thereof;
    a connecting member joined at one end thereof to one each of the respective ends of the major body portion; and
    end members joined at each end of the major body portion to one each of the connecting members, each end member comprising an arcuate body portion and arcuate flanges recurving from lateral edges of the arcuate body portion, the spacing between the flanges on either side of the arcuate body portion being dimensioned to allow one of the handle members of the rolling pin to snap fit within the space defined by the arcuate body portion of the end member, each end member snap fitting over each one of the handle members to bring the lateral edge portions of the major body portion into proximity to the surface of the cylindrical member of said rolling pin, the apparatus remaining essentially stationary relative to the cylindrical member on rotation of the said cylindrical member when pressure is applied to the flange, the lateral edge portions of the major body portion acting to strip adhering material from the surface of the cylindrical member on rotation of said cylindrical member during working of said material.

2. The apparatus of claim 1 wherein the major body portion of the apparatus is formed of two rectangular plates intersecting at an angle, the free lengthwise lateral edges of each of the plates forming the lateral edge portions which strip adhering material from the surface of the cylindrical member of the rolling pin on rotation of the cylindrical member in either direction.

3. The apparatus of claim 1 wherein the lateral edge portions taper axially toward the surface of the cylindrical member of the rolling pin.

4. The apparatus of claim 1 wherein the lateral edge portions contact the surface of the cylindrical member of the rolling pin and ride thereover on rotation of said cylindrical member.

5. The apparatus of claim 1 wherein the connecting members are each formed of a flat plate-like member, the plane of the plate-like member extending perpendicularly to the longitudinal axis of the rolling pin when the apparatus is attached to said rolling pin, the longitudinal axes of the end membes being perpendicular to the plane of each plate-like member of each of the connecting members.

6. The apparatus of claim 1 wherein the apparatus is unitary and is formed of an inherently resilient material.

7. A rolling pin apparatus formed of a rotating cylindrical member having handle members extending from either end thereof along the longitudinal axis of said cylindrical member, the improvement comprising:
    means for stripping adhering material from the surface of the cylindrical member comprising an elongated body member carried on the rolling pin apparatus, the longitudinal axis of the body member being parallel to the longitudinal axis of the cylindrical member, the body member having a continuous outer surface and having stripping edge portions disposed along the longitudinal side portion of said body member and extending outwardly of said body member, the stripping edge portions extending toward and being disposed adjacent to the exterior cylindrical surface of the cylindrical member.

8. In the combination of claim 7 wherein the stripping edge portions of the body member contact the surface of the cylindrical member of the rolling pin apparatus and ride thereover on rotation of said cylindrical member.

9. In the combination of claim 7 wherein the improvement further comprises:

end members connected to each end of the body member, each end member comprising an arcuate body portion and arcuate flanges recurving from lateral edges of the arcuate body portion, the spacing between the flanges on either side of the arcuate body portion being dimensioned to allow one of the handle members of the rolling pin apparatus to snap fit within the space defined by the arcuate body portion of the end member, each end member snap fitting over each one of the handle members to bring the edge portions of the body member into proximity to the surface of the cylindrical member of said rolling pin apparatus, the body member remaining essentially stationary relative to the cylindrical member on rotation of the said cylindrical member when pressure is applied to the flange, the edge portions of the body member acting to strip adhering material from the surface of the cylindrical member on rotation of said cylindrical member during working of said material.

10. In the combination of claim 7 wherein the improvement further comprises:

a pair of end clips one each of which is adapted to resiliently snap onto one each of said handle members, each clip including recesses receiving a portion of the user's hand to retain the body member stationary relative to the cylindrical member.

11. The apparatus of claim 1 wherein the lateral edge portions extend toward the surface of the cylindrical member.

* * * * *